US009394860B2

(12) United States Patent
Nishimura et al.

(10) Patent No.: US 9,394,860 B2
(45) Date of Patent: Jul. 19, 2016

(54) MOTORCYCLE

(71) Applicant: HONDA MOTOR CO., LTD., Tokyo (JP)

(72) Inventors: Shin Nishimura, Wako (JP); Takeshi Noumura, Wako (JP); Yasuhiro Fukuyoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/795,061

(22) Filed: Jul. 9, 2015

(65) Prior Publication Data

US 2016/0076494 A1    Mar. 17, 2016

(30) Foreign Application Priority Data

Sep. 12, 2014    (JP) .................................. 2014-187011

(51) Int. Cl.
| | |
|---|---|
| *F02M 35/02* | (2006.01) |
| *F02M 35/024* | (2006.01) |
| *B62K 11/00* | (2006.01) |
| *B01D 39/20* | (2006.01) |
| *B62K 11/04* | (2006.01) |
| *B62M 7/02* | (2006.01) |
| *F02B 61/02* | (2006.01) |
| *F02M 35/10* | (2006.01) |
| *F02M 35/16* | (2006.01) |

(52) U.S. Cl.
CPC ......... *F02M 35/024* (2013.01); *B01D 39/2065* (2013.01); *B62K 11/00* (2013.01); *B62K 11/04* (2013.01); *B62M 7/02* (2013.01); *F02B 61/02* (2013.01); *F02M 35/0202* (2013.01); *F02M 35/10091* (2013.01); *F02M 35/162* (2013.01)

(58) Field of Classification Search
CPC . F02M 35/024; F02M 35/02; F02M 35/0202; B01D 39/2065
USPC ......................................................... 180/219
See application file for complete search history.

(56) References Cited

U.S. PATENT DOCUMENTS

| | | | | |
|---|---|---|---|---|
| 5,100,726 | A * | 3/1992 | Nakagawa | H01B 1/22 428/323 |
| 7,571,702 | B2 * | 8/2009 | Sugawara | C08L 23/10 123/184.61 |
| 7,765,973 | B2 * | 8/2010 | Matsuda | F01L 1/022 123/90.14 |
| 8,096,381 | B2 * | 1/2012 | Castellani | B62K 11/04 180/219 |
| 2008/0277057 | A1 * | 11/2008 | Montgomery | B32B 5/26 156/307.1 |
| 2010/0096201 | A1 * | 4/2010 | Nagao | B62K 11/04 180/68.3 |
| 2015/0060178 | A1 * | 3/2015 | Matsushima | F02M 35/162 180/219 |

FOREIGN PATENT DOCUMENTS

JP        2005-105988 A       4/2005

* cited by examiner

*Primary Examiner* — Kevin Hurley
*Assistant Examiner* — Michael Stabley
(74) *Attorney, Agent, or Firm* — Westerman, Hattori, Daniels & Adrian, LLP

(57) ABSTRACT

In an air cleaner unit having a casing body of carbon fiber and configured to introduce outside air into an engine, a lamination layer part formed by laminating plural kinds of materials is arranged in a region of at least a portion of the air cleaner unit. The lamination layer part is formed of a carbon fiber layer and an elastic material layer. The casing body is provided with an opening to be connected to an air intake duct. The lamination layer part is formed of a first lamination layer part and a second lamination layer part of which the elastic material layer is thicker than that of the first lamination layer part. The second lamination layer part is arranged around the opening.

2 Claims, 10 Drawing Sheets

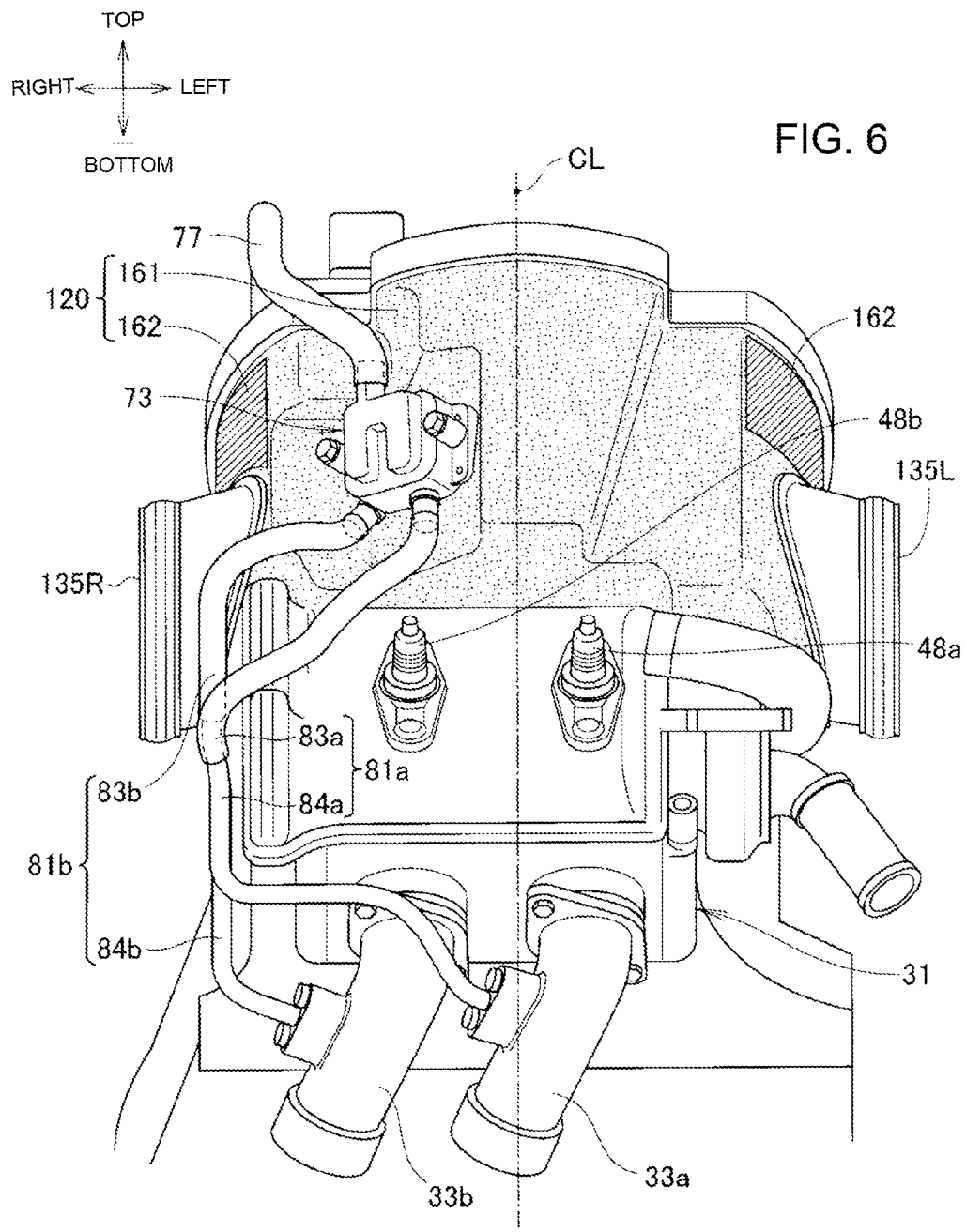

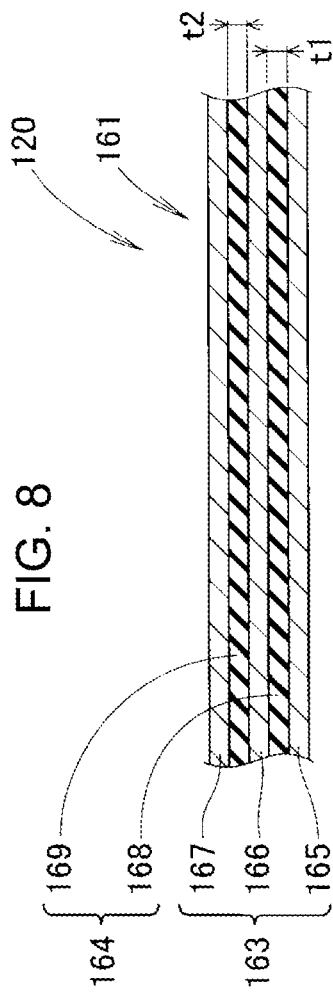

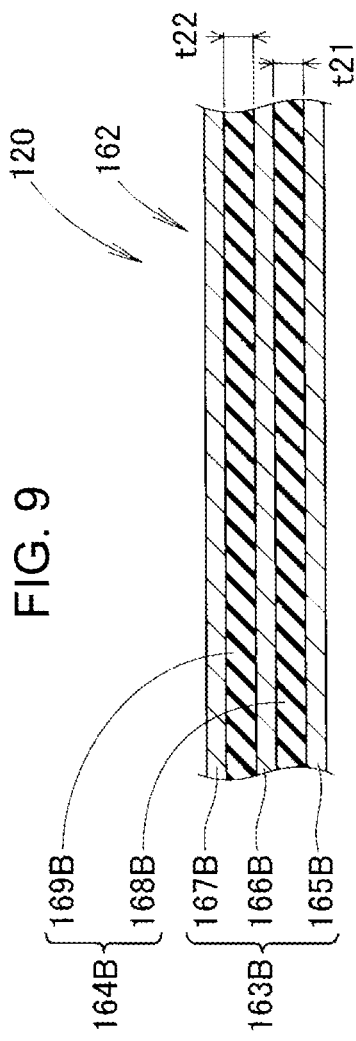

MOTORCYCLE

FIELD OF THE INVENTION

The present invention relates to an improvement in a two-wheeled motorcycle provided with an air cleaner unit.

BACKGROUND OF THE INVENTION

There is known a two-wheeled motorcycle provided with an air cleaner unit for purifying air and introducing the purified air to an engine (for example, see FIGS. 1 to 3 of Japanese Patent Application Laid-Open Publication No. 2005-105988 (JP '988)).

As shown in FIGS. 1 to 3 of 'JP 988, an air introducing passage (30) is arranged on the outside of a main frame (5) (a number with parenthesis designates a reference number of 'JP 988, those that follow are the same). An air cleaner box (18) (hereinafter, referred to as "air cleaner unit (18)") is arranged on the inside of the main frame (5). A V-type engine (10) for sucking the air purified by the air cleaner unit (18) is located below the air cleaner unit (18).

Lightening holes (42) are formed in the main frame (5). Left and right air intake ducts (43) extend to the air cleaner unit (18) in such a way as to pass through the lightening holes (42). Air introducing passages (30) are configured to communicate with the air intake ducts (43). The air passes through the air introducing passages (30) and enters the air cleaner unit (18) through the left and right air intake ducts (43). After purified by the air cleaner unit (18), the air flows into the engine (10).

In order to lightening the air cleaner unit as above, it is conceivable to use a relatively light carbon fiber as a material of the air cleaner unit. In the case of the air cleaner unit using the carbon fiber, it may be required to provide a reinforcing rib for reducing or suppressing noises and vibrations. In the case of forming a rib structure by the carbon fiber, the forming of the rib may take a lot of time to thereby cause an increase in cost. As a countermeasure against the above, when a layer of the carbon fiber is thickened, it is possible to reduce or decrease air intake noises and vibrations. However, there is a problem that a capacity of the air cleaner unit is decreased with increase in thickness of the layer of carbon fiber.

It is desired to provide a technique which is capable of reducing or decreasing the air intake noises and vibrations and ensuring the capacity of the air cleaner unit.

SUMMARY OF THE INVENTION

The present invention has been made in consideration of the above described circumstances, and has an objective of providing a technique which is capable of reducing or decreasing air intake noises and vibrations caused from an air cleaner unit and of ensuring a capacity of the air cleaner unit.

According to a first aspect of the present invention, there is provided a motorcycle in which a carbon fiber is used for an air cleaner unit, and outside air is introduced through the air cleaner unit into an engine, characterized in that a lamination layer part formed by laminating plural kinds of materials is arranged in a region of at least a portion of the air cleaner unit, and the lamination layer part is formed of a carbon fiber layer and an elastic material layer.

According to this aspect, the lamination layer part is formed of a carbon fiber layer and an elastic material layer. Since the air intake noise and the like are effectively absorbed by the elastic material layer, the thickness of the air cleaner unit can be reduced. Due to the reduction in thickness, a capacity of the air cleaner unit can be ensured sufficiently. In addition, the air intake noises and vibrations produced in the air cleaner unit can be reduced or decreased.

According to a second aspect of the present invention, each of the carbon fiber layer and the elastic material layer is provided in multiple layers in the lamination layer part, and the lamination layer part comprises a first lamination layer part and a second lamination layer part of which the elastic material layer is thicker than that of the first lamination layer part.

According to this aspect, each of the carbon fiber layer and the elastic material layer is provided in multiple layers. Since the lamination layer part is provided with the multiple elastic material layers, the air intake noises transmitted to the lamination layer part can be more effectively reduced than the lamination layer part having a single layer of the elastic material layer.

According to a third aspect of the present invention, the air cleaner unit includes an air intake duct for introducing the outside air and a casing body provided with an opening to be connected to the air intake duct, and the second lamination layer part is arranged around the opening.

According to this aspect, a swirl of an air stream due to the air intake is easily caused in and around the opening of the air cleaner unit into which the outside air is introduced. In the present invention, since the second lamination layer part of which the elastic material layer is thicker than that of the first lamination layer part is arranged around the opening which is easily subject to the influence of the swirls of the air stream due to the air intake, it is possible to reduce or decrease the air intake noises and the vibrations caused in the air cleaner unit.

According to a fourth aspect of the present invention, the engine is formed in a V-type, and includes cylinder sections of the engine each of which is arranged in front of and at the rear of the casing body, and a pair of left and right vehicle body frames is located on left and right lateral sides of the casing body, wherein the first lamination layer part is arranged on a surface of the casing body facing the cylinder sections, and the second lamination layer part is arranged in at least a part of an upper surface of the casing body.

According to this aspect, the second lamination layer part is arranged in at least a part of the upper surface of the casing body. Since the second lamination layer part is located in the upper surface of the casing body in a vehicle formed such that a rider is located above the upper surface of the casing body, the air intake noises and vibrations transmitted from the casing body toward the rider become hard to be transmitted to the rider. Therefore, it is possible to enhance silence of the air cleaner unit.

According to a fifth aspect of the present invention, the upper surface of the casing body is formed with a recess portion for accommodating a battery, and the recess portion is formed in the first lamination layer part, wherein a cushioning material is arranged between the first lamination layer part and the battery, and the battery is mounted on the upper surface of the casing body by fastening a battery cover for covering the battery.

According to this aspect, the cushioning material is arranged between the recess portion in which the battery is accommodated and the battery. With provision of the cushioning material, the recess portion in which the battery is accommodated can be formed in the first lamination layer part of which the elastic material layer is thinner than that of the second lamination layer part. As a result, due to the cushioning material and the first lamination layer part, the air intake noises and vibrations caused in the air cleaner unit can be reduced or decreased while reducing the cost for the air cleaner unit.

BRIEF DESCRIPTION OF THE DRAWINGS

The present invention will be described with reference to the accompanying drawings, wherein:

FIG. 6 is a front view of the air cleaner unit and the surrounding area thereof;

FIG. 8 is a cross sectional view of a first lamination layer part;

FIG. 9 is a cross sectional view of a second lamination layer part; and

DETAILED DESCRIPTION OF THE INVENTION

Figure 1:
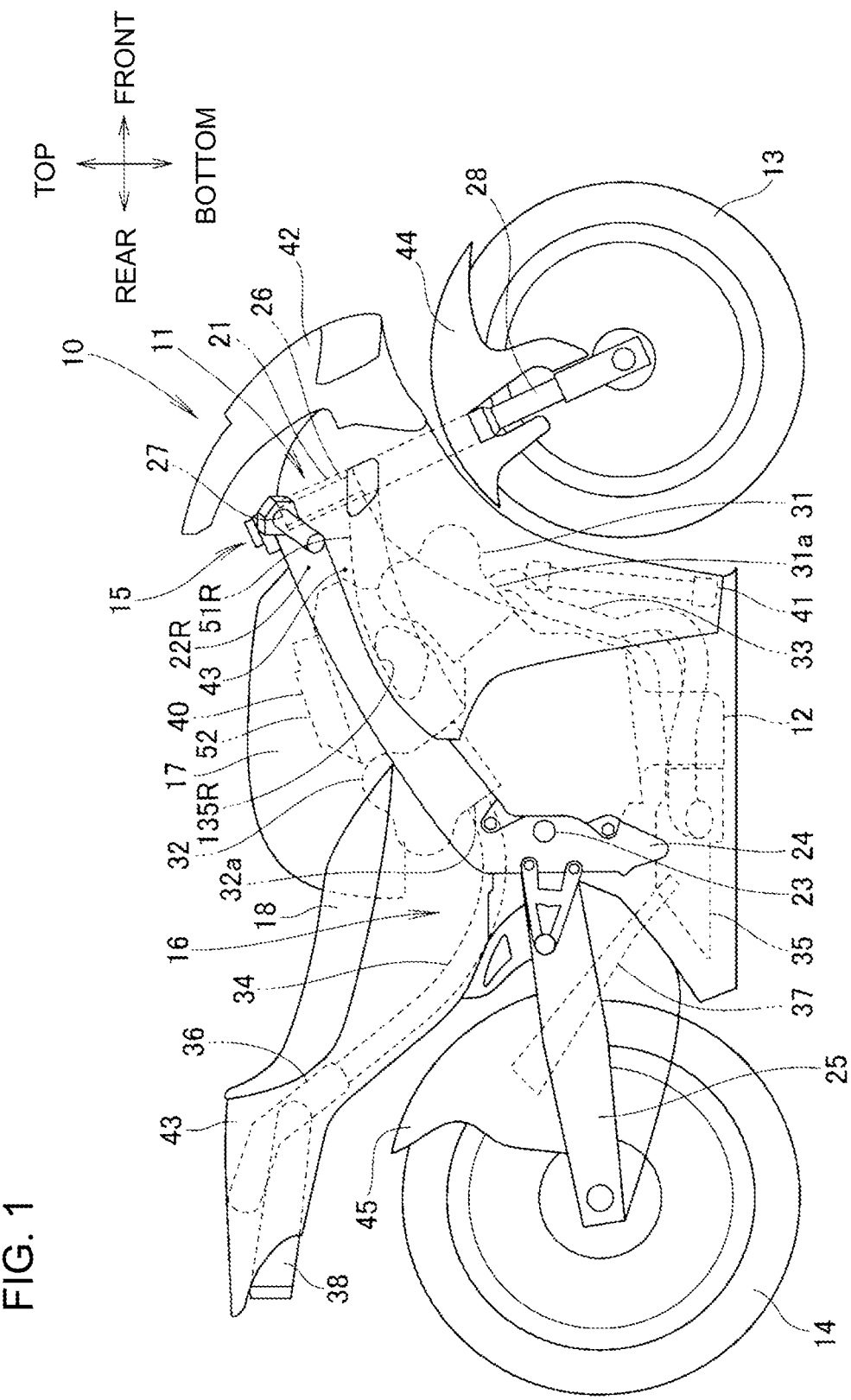
FIG. 1 is a right side view of a two-wheeled motorcycle in accordance with an embodiment of the present invention.

Hereinafter, an embodiment of the present invention will be described in detail. In the drawings and the embodiment, the orientation such as "front", "rear", "top", "bottom "left" and "right"," shall be described in accordance with the direction viewed from a driver riding on a motorcycle.

The embodiment of the present invention will be described with reference to the drawings.

As shown in FIG. 1, a two-wheeled motorcycle 10 is a straddle type vehicle and includes a vehicle body frame 11, an engine 12 as a power source mounted on the vehicle body frame 11, a front wheel steering section 15 supporting a front wheel 13 in a steerable manner which is located forwardly of the engine 12 in a front part of the vehicle body frame 11, a rear wheel suspension section 16 supporting a rear wheel 14 in a swingable manner which is located in a rear part of the vehicle body frame 11, a fuel tank 17 disposed above the engine 12 and mounted on the vehicle body frame 11, and a rider's seat 18 on which the rider rides in a straddling fashion, disposed at the rear of the fuel tank 17 and mounted on the vehicle body frame 11.

The vehicle body frame includes, as the main components, a head pipe 21, a pair of left and right main frames 22 extending from the head pipe 21 to the rear side of the vehicle, and a pair of pivot frames 24 which extends downwardly from rear ends of the main frames 22 and supports a pivot shaft 23 functioning as a support shaft of the rear wheel suspension section 16.

The rear wheel suspension section 16 has a swing arm 25 which extends from the pivot shaft 23 to the rear of the vehicle and supports the rear wheel 14 at the rear end thereof. The front wheel steering section 15 includes a steering shaft 26 which is inserted into the head pipe 21 and functions as a rotation axis, a steering handle 27 mounted on an upper end of the steering shaft 26, and a front fork 28 which is integrally provided with the steering shaft 26 and extends downwardly in the forward direction so as to carry the front wheel 13.

The engine 12 to be mounted on the vehicle body frame 11 is the so-called V-type engine having a forwardly inclined front cylinder 31 and a rearwardly inclined rear cylinder 32. A front cylinder exhaust pipe 33 is connected to an exhaust port 31a of the front cylinder 31. The front cylinder exhaust pipe 33 extends first on the front side of the vehicle and is directed to the rear of the vehicle in a curved manner. A rear end of the front cylinder exhaust pipe 33 is connected to one chamber 35 in which a catalyser device is accommodated, and one muffler 37 extends from this one chamber 35 to the rear of the vehicle. The rear cylinder 32 is formed of a plurality of cylinders (two cylinders) which are arranged side by side in the vehicle width direction, and rear cylinder exhaust pipes 34 for leading exhaust gas are connected to exhaust ports 32a of the rear cylinder 32. The rear cylinder exhaust pipes 34 extend to the rear of the vehicle and are connected to the other muffler 38 via the other chamber 36 in which a catalyser device is accommodated. An air cleaner unit 40 is arranged above the engine 12 in a space formed between the front cylinder 31 and the rear cylinder 32. Namely, the cylinder sections (the front cylinder 31 and the rear cylinder 33) of the engine 12 are arranged in front of and behind a casing body 53 of the air cleaner unit 40.

A radiator unit 41 is arranged at the rear of the front wheel 13 and in front of the engine 12. A front part of the vehicle body is covered with a cowling 42, and the lateral side of the vehicle are covered with a vehicle body cover 43. A front fender 44 is mounted on the front fork 28 in such a way as to cover an upper side of the front wheel 13.

Figure 2:
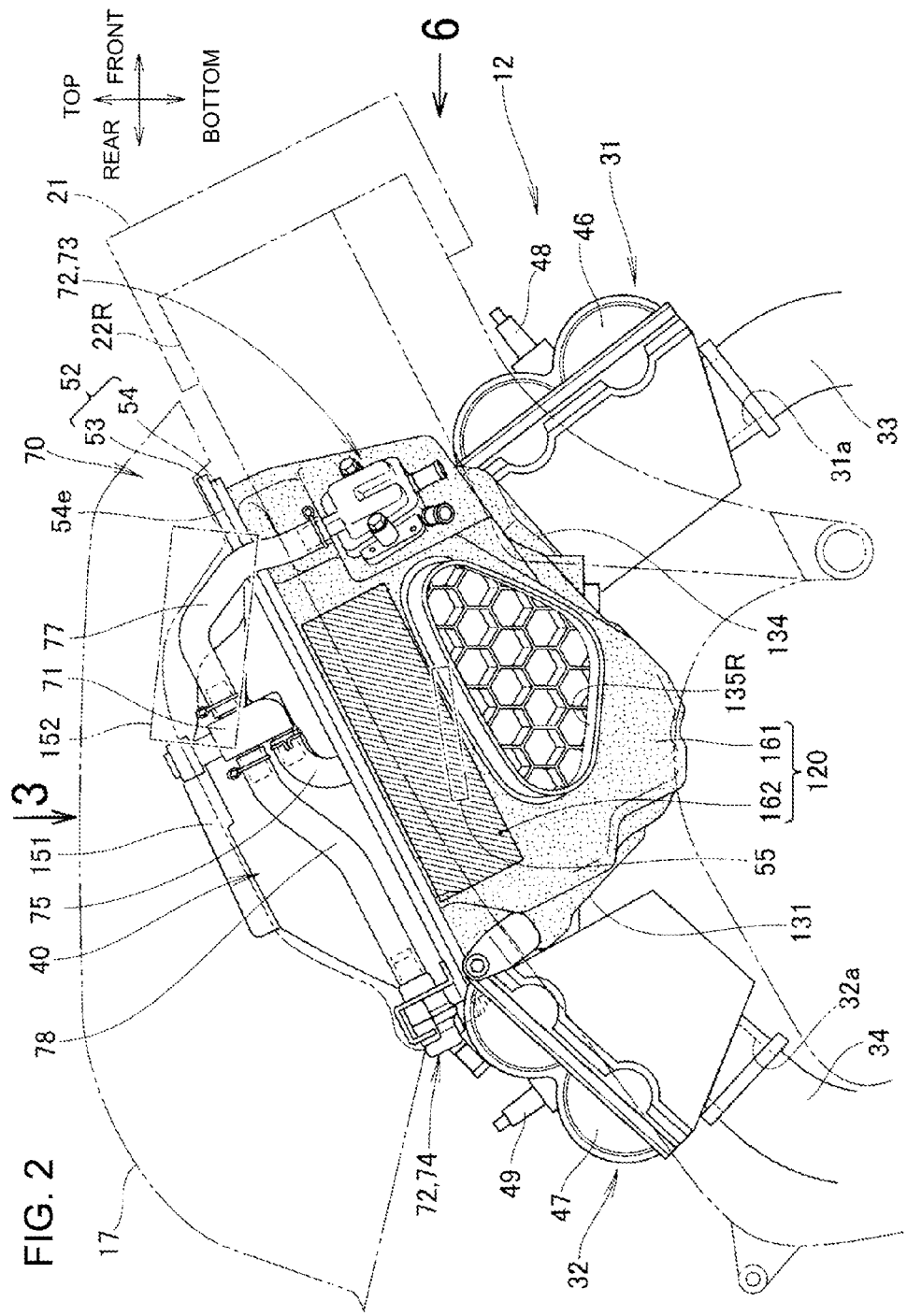
FIG. 2 is an enlarged view of an air cleaner unit and the surrounding area thereof.

As shown in FIG. 2, an upper end of the front cylinder 31 of the engine 12 is covered with a front head cover 46, and a front ignition device 48 is installed in the front head cover 46. Similarly, an upper end of the rear cylinder 32 is covered with a rear head cover 47, and a rear ignition device 49 is installed in the rear head cover 47.

The front cylinder 31 is formed of a plurality of cylinders which are arranged side by side in the vehicle width direction, and the front cylinder exhaust pipes 33 for leading the exhaust gas are connected to the exhaust ports 31a of the front cylinder 31. The rear cylinder 32 is formed of the plurality of cylinders which are arranged side by side in the vehicle width direction, and the rear cylinder exhaust pipes 34 for leading the exhaust gas are connected to the exhaust ports 32a of the rear cylinder 32. Namely, the engine 12 is the V-type engine formed of two front cylinders and two rear cylinders.

The air cleaner unit 40 is arranged above the engine 12 between the front cylinder 31 and the rear cylinder 32. The fuel tank 17 extends from the upper side of the air cleaner unit 40 to the rear of the vehicle in such a way as to cover the air cleaner unit 40.

Figure 3:
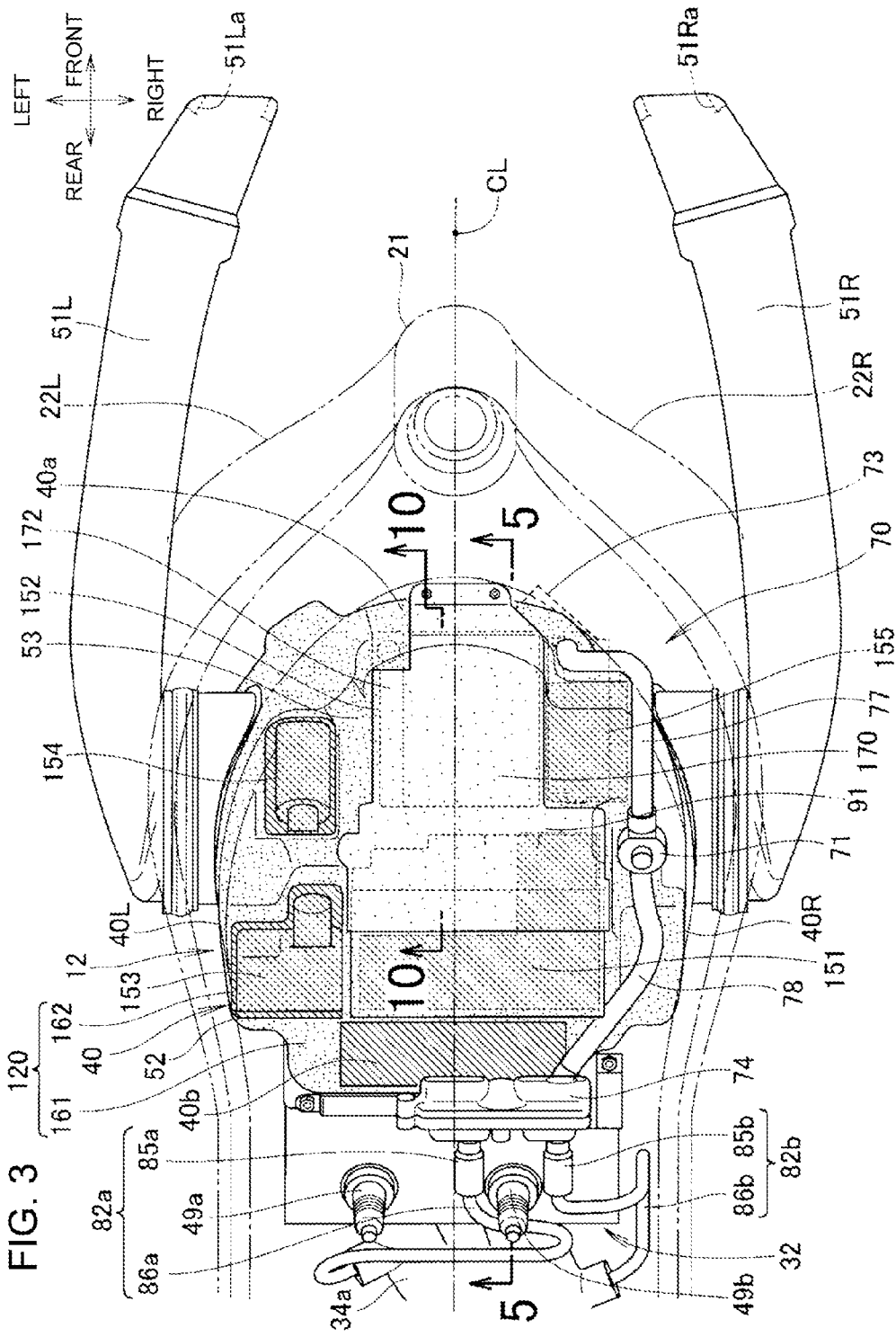
FIG. 3 is a plan view of the air cleaner unit and the surrounding area thereof taken in the direction of arrow 3 of FIG. 2.

As shown in FIG. 3, the engine 12 and the air cleaner unit 40 are arranged between the pair of main frames 22L, 22R. Namely, the pair of left and right vehicle body frames (left and right main frames 22L, 22R) each is located on left and right sides of the casing body 52 of the air cleaner unit 40. To lateral surfaces 40L, 40R in the vehicle width direction of the air cleaner unit 40, there are connected air intake ducts 51L, 51R for introducing air into the air cleaner unit 40. Air inlets 51La, 51Ra are provided on each front end of the air intake ducts 51L, 51R. Each of the air intake ducts 51L, 51R passes through lightening holes formed in the left and right main frames 22L, 22R.

Next, the structure of the air cleaner unit will be described.

Figure 4:
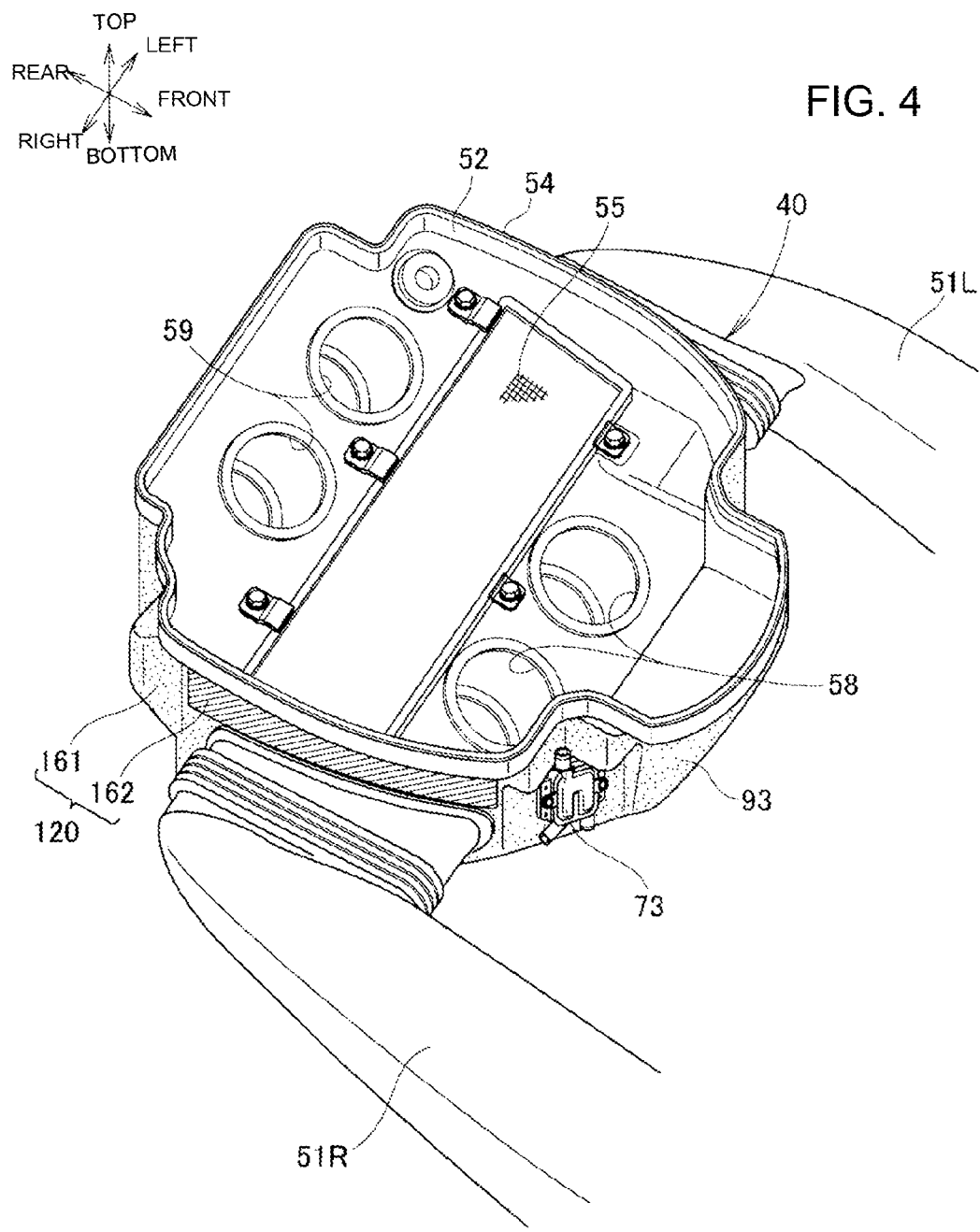
FIG. 4 is a perspective view of the air cleaner unit.
Figure 5:
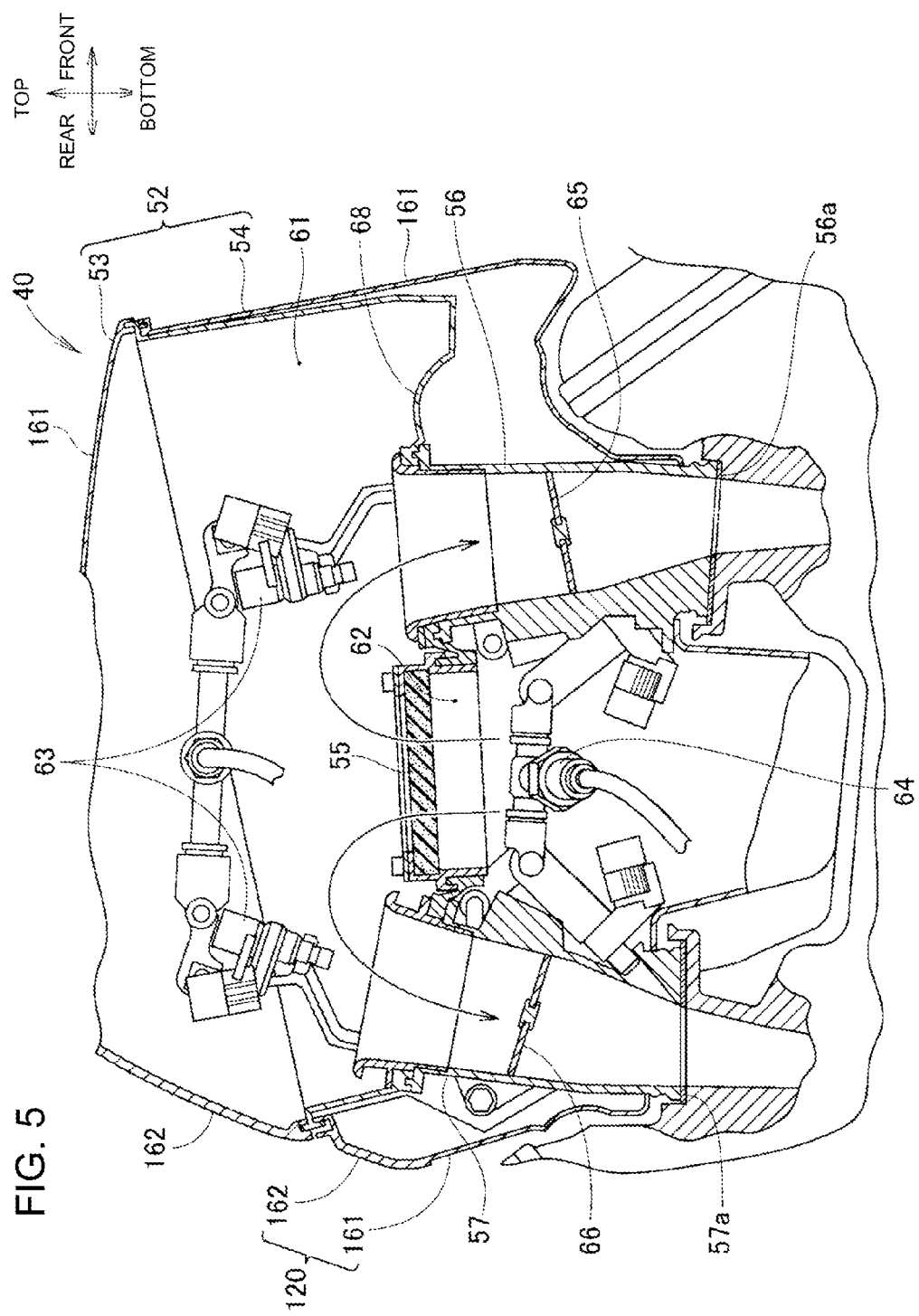
FIG. 5 is a cross sectional view of the air cleaner unit, taken on line 5-5 of FIG. 3.

As shown in FIGS. 4 and 5, the air cleaner unit 40 has the casing body 52 and an element 55 which is provided in an interior of the casing body 52 for allowing the air to be passed therethrough so as to purify the air. The casing body 52 is formed of an upper half body 53 and a lower half body 54 which are joined together from upper and lower sides. Front and rear funnel holes 58, 59 are provided in front of and at the rear of the elements 55, and a front funnel 56 and a rear funnel 57 for supplying the purified air to the front cylinder 31 and the rear cylinder 32 each are inserted into and attached to these front and rear funnel holes 58, 59.

The casing body 52 is partitioned by the element 55 and a partition wall 68 into a clean side 61 and a dirty side 62. The clean side 61 is formed in an upper part of the casing body 52 and the dirty side 62 is formed in a lower part of the casing body 52. A first fuel injection nozzle 63 for feeding atomized fuel is located in the interior of the casing body 52 and at a position facing each inlet of the front and rear funnels 56, 57. A second fuel injection nozzle 64 is located on a downstream side of the first fuel injection nozzle 63. Throttle valves 65, 66 are provided each in intermediate positions in the axial directions of the front and rear funnels 56, 57 and between the first fuel injection nozzle 63 and the second fuel injection nozzle 64. A front seal member 56a for preventing a leak of the intake air is interposed between the front cylinder 31 of the engine 12 (see FIG. 2) and the front funnel 56, while a rear seal member 57a for preventing a leak of the intake air is interposed between the rear cylinder 32 and the rear funnel 57.

The air introduced by the air intake ducts 51L, 51R from lateral sides of the air cleaner unit 40 to the dirty side 62 which forms a lower half of the air cleaner unit 40 is filtered by the element 55 and flows into the clean side 61 which forms an upper half of the air cleaner unit 40. Then, the air flows from the front and rear funnels 56, 57 which are arranged to face into the clean side 61, to an intake side of the engine 12 (see FIG. 2).

Next, a secondary air supply device, etc. for purifying the exhaust gas by burning a combustible component will be described.

Referring again to FIGS. 2 and 3, the secondary air supply device 70 includes an electromagnetic valve 71 for supplying or intercepting the purified air within the air cleaner to an exhaust system, and a reed valve 72 being opened and closed by a negative pressure of an exhaust channel (the exhaust port 31a, 32a) of the engine 12 which is provided in a downstream side of the electromagnetic valve 71. The reed valve 72 is comprised of a front reed valve 73 and a rear reed valve 74. The front reed valve 73 is arranged in a front part 40a of the air cleaner unit 40, while the rear reed valve 74 is arranged in a rear part 40b of the air cleaner unit 40.

A connecting pipe conduit 75 for supplying the purified air from the air cleaner unit 40 to the electromagnetic valve 71 provides a connection between the air cleaner unit 40 and the electromagnetic valve 71. An upstream front pipe conduit 77 provides a connection between the electromagnetic valve 71 and the front reed valve 73, and an upstream rear pipe conduit 78 provides a connection between the electromagnetic valve 71 and the rear reed valve 74.

As shown in FIG. 6, front pipe conduit members 81a, 81b extend from the front reed valve 73, and each distal end of the front pipe conduit members 81a, 81b is connected to an exhaust channel (the front cylinder exhaust pipes 33a, 33b). Referring again to FIG. 3, rear pipe conduit members 82a, 82b extend from the rear reed valve 74, and each distal end of the rear pipe conduit members 82a, 82b is connected to an exhaust channel (the rear cylinder exhaust pipes 34). The rear pipe conduit member 82 provides a connection between the rear reed valve 74 and the rear cylinder exhaust pipe 34. Namely, the reed valve 72 is located at a position facing the exhaust channel, between the air cleaner unit 40 and the exhaust channel of the engine 12.

Like this, the reed valve 72 is comprised of the front reed valve 73 and the rear reed valve 74. The front reed valve 73 is used for the front cylinder 31 while the rear reed valve 74 is used for the rear cylinder 32, in such a manner that the secondary air is supplied from the air cleaner unit 40 to the exhaust channel of the engine 12.

Referring to FIGS. 1 and 6, the front cylinder exhaust pipe 33 extends in the forward direction of the vehicle and thereafter is curved so as to be directed to the rear side of the vehicle while lying toward right in the vehicle width direction, and the front reed valve 73 is arranged in such a way as to lie toward right in the vehicle width direction similar to the direction of the front cylinder exhaust pipe 33. The front reed valve 73 and the front cylinder exhaust pipes 33a, 33b are connected each by the front pipe conduit members 81a, 81b. In the drawing, a reference character CL designates a center line in the vehicle width direction. By the way, although the front cylinder exhaust pipe and the front reed valve are arranged in such a way as to lie a little toward right in the vehicle width direction in this embodiment, they may be arranged in such a way as to lie toward left in the vehicle width direction.

The front pipe conduit members 81a, 81b are comprised of front tubes 83a, 83b which are made of an elastic material such as a rubber tube or the like having low thermal conductivity and extend from the front reed valve 73, and front tubes 84a, 84b which are made of metal and extend from each distal end of the front tubes 83a, 83b of the elastic material to thereby be connected to the front cylinder exhaust pipes 33a, 33b. Since each part of the front pipe conduit member 81a, 81b connected to the front reed valve 73 is formed of the front tubes 83a, 83b of the elastic material, the thermal effect on the front reed valve 73 due to the thermal conduction from the front cylinder exhaust pipes 33a, 33b can be reduced. In addition, it is advantageous in that the vibrations from the front cylinder exhaust pipes 33a, 33b are hard to be transmitted to the front reed valve 73.

The front reed valve 73 and the front cylinder exhaust pipes 33a, 33b are arranged on the right side in the vehicle width direction and connected by the front pipe conduit members 81a, 81b. Therefore, the lengths of the front pipe conduit members 81a, 81b which provide a connection between the front reed valve 73 and each of the front cylinder exhaust pipes 33a, 33b can be shortened. In addition, since the front pipe conduit members 81a, 81b are able to be checked from the outside in the vehicle width direction, it is possible to improve the maintainability.

Referring again to FIG. 3, the rear pipe conduit members 82a, 82b which provide a connection between the rear reed valve 74 and each of the rear cylinder exhaust pipes 34a, 34b are located at lateral sides of rear ignition devices 49a, 49b and extend from the front side of the vehicle to the rear side of the vehicle.

The rear pipe conduit member 82 is comprised of rear tubes 85a, 85b each of which is made of an elastic material such as a rubber tube or the like having low thermal conductivity and extends from the rear reed valve 74, and rear tubes 85a, 85b which are made of metal and extend from each distal end of the rear tubes 85a, 85b of the elastic material to thereby be connected to each of the rear cylinder exhaust pipes 34a, 34b. Since each part of the rear pipe conduit members 82a, 82b connected to the rear reed valve 74 is formed of the rear tubes 85a, 85b of the elastic material, the thermal effect on the rear reed valve 74 due to the thermal conduction from the rear cylinder exhaust pipes 34a, 34b can be reduced. In addition, it is advantageous in that the vibrations from the rear cylinder exhaust pipes 33a, 33b are hard to be transmitted to the rear reed valve 74.

Referring again to FIG. 2, the front reed valve 73 is arranged in the lower half body 54 of the casing body 52. The front reed valve 73 and the rear reed valve 74 are located at substantially the same height. In a side view of the vehicle, the pair of main frames 22 and the front reed valve 73 are arranged at a position to overlap with each other.

The casing body 52 is divided into the upper half body 53 and the lower half body 54 in the upward and downward direction, and divided surfaces 54e of the casing body 52 are inclined in the rearward direction of the vehicle in relation to a horizontal plane in the forward and rearward direction of the vehicle. Moreover, the front reed valve 73 and the rear reed valve 74 are arranged on the casing body 52 at substantially the same height.

Even if the divided surface 54e of the casing body 52 are arranged to be inclined in the forward and rearward direction, the front reed valve 73 and the rear reed valve 74 are arranged on the casing body 52 at substantially the same height. Therefore, the casing main body 53 can be compactified in the vertical direction, and the weight distribution thereof can be optimized.

As shown in FIGS. 1 and 3, the rear cylinder exhaust pipes 34a, 34b lie toward the right side in the vehicle width direction and extend in the rearward direction of the vehicle. The rear reed valve 74 is arranged at a position to lie toward the right side in the vehicle width direction which is identical with the direction of the rear cylinder exhaust pipe 34.

The rear cylinder exhaust pipes 34a, 34b and the rear reed valve 74 are arranged at a location to lie toward the right side in the vehicle width direction which is the same side in the vehicle width direction. Therefore, the piping of the rear pipe conduit members 82a, 82b for connecting the rear reed valve 74 and each of the rear cylinder exhaust pipes 34a, 34b can be simplified.

Next, it will be described mainly that the casing body of the air cleaner unit is formed of a lamination layer structure using a carbon fiber.

Figure 7A:
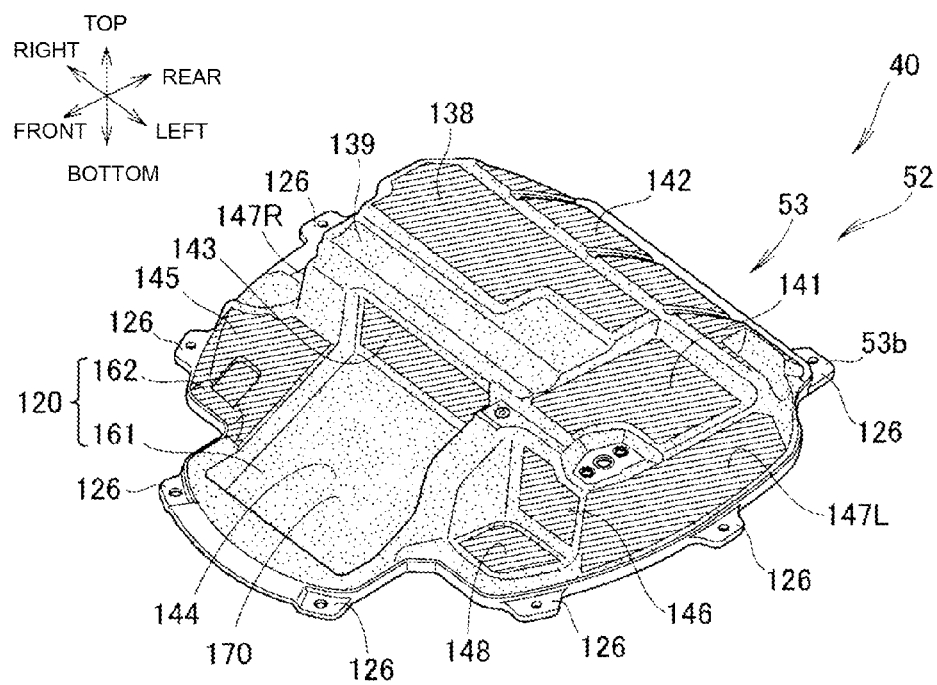
FIG. 7A is a perspective view of an upper half body of the air cleaner unit and FIG. 7B is a perspective view of a lower half body of the air cleaner unit.
Figure 7B:
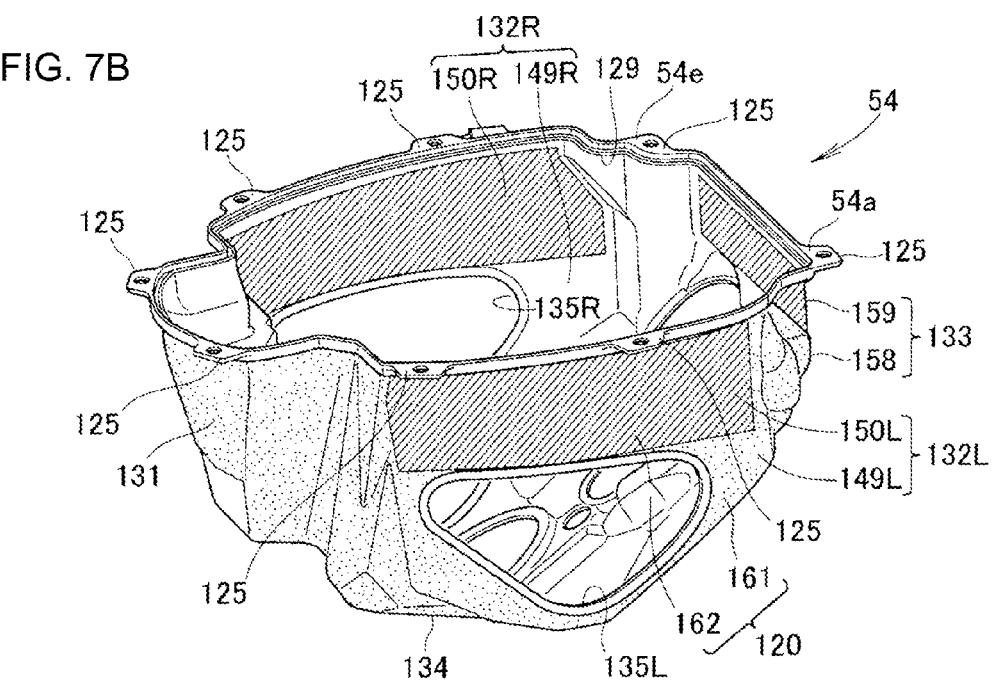

As shown in FIGS. 7A and 7B, the casing body 52 of the air cleaner unit 40 is formed of the lower half body 54 and the upper half body 53 configured to be joined to the lower half body 53 from above. Upper flanges 126 formed in a lower end 53b of the upper half body 53 are placed in alignment with lower flanges 54a formed in an upper end 54a of the upper half body 54 so as to be fastened together, and when having been fastened, the casing body 52 is formed.

The lower half body 54 has an opening portion 129 to be closed by the upwardly open upper half body 53. Around the circumference of this opening portion 129, the lower half body 54 is formed with a lower front wall section 131, left and right lower lateral wall sections 132L, 132R extending rearwardly from end portions of the lower front wall section 131, and a lower rear wall section 133 extending between the left and right lower lateral wall sections 132L, 132R. A bottom plate section 134 forming a bottom of the lower half body 54 extends between the lower front wall section 131 and the lower rear wall section 133 and between the left and right lower lateral wall sections 132L, 332R. Left and right openings 135L, 135R are provided in each of the left and right lower lateral wall sections 132L, 132R. The air intake ducts 51L, 51R (see FIG. 3) are able to be connected to these left and right openings 135L, 135R.

The upper half body 53 includes a first ceiling section 138, a second ceiling section 139 provided in front of the first ceiling section 138 at a position lower than the first ceiling section 138, a third ceiling section 141 provided on the left side of the first ceiling section 138 and the second ceiling section 139 at a position lower than the second ceiling section 139, a ceiling rearward inclined section 142 which is gently inclined rearwardly at the rear of the first ceiling section 138 and the third ceiling section 141, a first upper front wall section 143 located forwardly of the second ceiling section 139, a ceiling forward inclined section 144 which is gently inclined obliquely downwardly in the forward direction from a lower end of the first upper front wall section 143, a second ceiling forward inclined section 145 located on the right side of the ceiling forward inclined section 144, a second upper front wall section 146 located in front of the third ceiling section 141, a fourth ceiling section 148 which is provided forwardly of the second upper front wall section 146 at a lower position than the third ceiling section 141, a left upper lateral wall section 147L located on the left side of the second upper front wall section 146, and a right upper lateral wall section 147R located on the opposite side in the vehicle width direction of the left upper lateral wall section 147L.

Referring to FIG. 3 at the same time, an FI unit 151 is attached to the first ceiling section 138. A battery 152 is mounted through a cushioning material 171 (see FIG. 10) on the ceiling forward inclined section 144 located forwardly of the first ceiling section 138. A winker switch 153 is fitted on the third ceiling section 141 located on the left side of the first ceiling section 138. A starting magneto 154 is fitted on the fourth ceiling section 148 located forwardly of the third ceiling section 141. A fuse box 155 is fitted on the second ceiling forward inclined section 145 located on the right side of the ceiling forward inclined section 144. Namely, various kinds of parts containing electric components are arranged on an upper surface of the upper half body 53.

Next, it will be described that the lamination layer part of the casing body has a lamination structure of a carbon fiber layer (CFRP) and an elastic material layer which are laminated in multiple layers. Although acrylonitrile-butadiene rubber (NBR) is used as an elastic material in this embodiment, the elastic materials other than the NBR may be used.

FIG. 8 shows a cross section of a first lamination layer part 161. In the first lamination layer part 161, a carbon fiber layer 163 and an elastic material layer 164 are provided in multiple layers. More precisely, the first lamination layer part 161 has a five-layer structure formed of a first carbon fiber layer 165, a first elastic material layer 168 which is laminated on the first carbon fiber layer 165, a second carbon fiber layer 166 which is laminated on the first elastic material layer 168, a second elastic material layer 169 which is laminated on the second carbon fiber layer 166, and a third carbon fiber layer 167 which is laminated on the second elastic material layer 169.

In this embodiment, the first elastic material layer 168 has a plate thickness (t1) of 0.2 mm and the second elastic material layer 169 has a plate thickness (t2) of 0.2 mm. Each of plate thicknesses of the first carbon fiber layer 165, the second carbon fiber layer 166 and the third carbon fiber layer 167 are set to be 0.2 mm.

The first lamination layer part 161 formed as above are applied to regions indicated by multiple dots in FIG. 7A, of the upper half body 53 and the lower half body 54. By the way, the plate thickness is used with the same meaning as a thickness.

FIG. 9 shows a cross section of the second lamination layer part 162. In the second lamination layer part 162, a carbon fiber layer 163B and an elastic material layer 164B are provided in multiple layers. More precisely, the second lamination layer part 162 has a five-layer structure formed of a first carbon fiber layer 165B, a first elastic material layer 168B which is laminated on the first carbon fiber layer 165B, a second carbon fiber layer 166B which is laminated on the first elastic material layer 168B, a second elastic material layer 169B which is laminated on the second carbon fiber layer 166B, and a third carbon fiber layer 167B which is laminated on the second elastic material layer 169B.

In this embodiment, the first elastic material layer 168B has a plate thickness (t21) of 0.3 mm and the second elastic material layer 169B has a plate thickness (t22) of 0.3 mm. Each of plate thicknesses of the first carbon fiber layer 165B, the second carbon fiber layer 166B and the third carbon fiber layer 167B are set to be 0.2 mm.

The second lamination layer part 162 formed as above are applied to regions indicated by oblique lines in FIG. 7A, of the upper half body 53 and the lower half body 54.

Next, a boundary region between the first lamination layer part 161 and the second lamination layer part 162 will be described. A lower surface of the first carbon fiber layer 165 of the first lamination layer part 161 is brought into coincidence with a lower surface of the first carbon fiber layer 165B of the second lamination layer part 162. On the basis of the lower surface of the first carbon fiber layer 165 and the lower surface of the first carbon fiber layer 165B, the first elastic material layers 168, 168B, the second carbon fiber layers 166, 166B, the second elastic material layers 169, 169B and the third carbon fiber layers 167, 167B are laminated one on another in this order. By being laminated in this way, a difference in level is formed in a boundary region between the first lamination layer part 161 and the second lamination layer part 162. Since the difference in level in the boundary region is formed on an outer surface of the lamination layer part, air intake noises and vibrations caused in the air cleaner unit can be reduced or decreased without exerting an influence upon a capacity of the air cleaner unit.

Referring to FIGS. 3 and 7A, B together, in the upper half body 53, the first lamination layer part 161 is applied to the ceiling forward inclined section 144 on which the battery 152 is fitted, and on the second ceiling section 139. Moreover, the second lamination layer part 162 is applied to the first ceiling section 138 to which the FI unit 151 is attached, the third ceiling section 141 on which the winker switch 153 is fitted, the ceiling rearward inclined section 142 located at the rear of the first ceiling section 138 and the third ceiling section 141, the first upper front wall section 143 located in front of the second ceiling section 139, the second upper front wall section 146 located in front of the third ceiling section 141, the fourth ceiling section 148 which is located in front of the second upper front wall section 146 and on which the starting magneto 154 is fitted, and the second ceiling forward inclined section 145 on which the fuse box 155 is fitted.

Referring to FIG. 2 at the same time, in the lower half body 54, the first lamination layer part 161 is applied to the lower front wall section 131, each lower portions 149L, 149R of the left and right lower lateral wall sections 132L, 132R, a lower portion 158 of the lower rear wall section 133, and the bottom plate section 134.

With respect to the lower half body 54, the first lamination layer part 161 is arranged on each surface of the lower half body 54 facing the cylinder section (the front cylinder 31 and the rear cylinder 32). More precisely, the bottom plate section 134 located above the front cylinder 31 and the lower front wall section 131 located in front of the rear cylinder 32 are formed by the first lamination layer part 161.

Further, the second lamination layer part 162 is arranged on upper portions 150L, 150R of the left and right lower lateral wall sections 132L, 132R which are located above the left and right openings 135L, 135R and provided along the divided surface 54e divided from the upper half body 53, and on an upper portion 159 of the lower rear wall section 133. Namely, the second lamination layer part 162 which is larger in the thickness of the elastic material layer than the first lamination layer part 161 is arranged in the vicinity of the opening 135L, 135R and above the openings 135L, 135R.

Next, the mounting structure, etc. of the battery mounted on the upper half body will be described.

Figure 10:
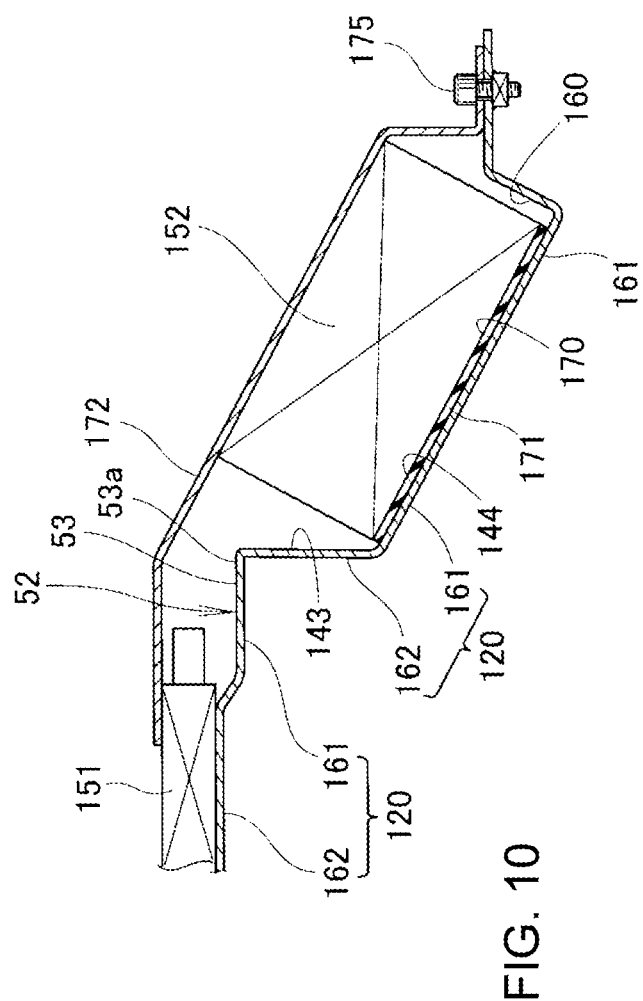
FIG. 10 is a cross sectional view taken on line 10-10 of FIG. 3.

As shown in FIG. 10, the ceiling forward inclined section 144 is formed in an upper surface 53a of the upper half body 53 forming the case body 52, and the battery 152 is mounted on the ceiling forward inclined section 144. The upper surface 53a of the upper half body 53 has a recessed portion 170 formed by the ceiling forward inclined section 144, the first upper front wall section 143 and the third upper front wall section 160, the battery 152 is accommodated in this recessed portion 170.

The recessed portion 170 is formed by the first lamination layer part 161 (see FIG. 7A). The cushioning material 171 is arranged between the first lamination layer part 161 and the battery 152. The battery 152 is mounted on the upper surface 53a of the casing body 52 by fastening a battery cover 172 for covering the battery 152 by a fastening bolt 175. In this embodiment, although a sponge is used for the cushioning material 171, it is not limited to the sponge. The material can be freely selected as far as the cushioning material is used.

The operation and effects of the above described motorcycle will be described below.

Referring to FIGS. 2 and 7A, B to 9 together, the lamination layer part 120 consisting of the first lamination layer part 161 and the second lamination layer part 162 is formed of the carbon fiber layer 163 and the elastic material layer 164

In the present invention, the lamination layer part 120 is formed of the carbon fiber layers 163, 163B and the elastic material layers 164, 164B. Since the elastic material layers 164, 164B are provided in addition to the carbon fiber layers 163, 163B, the thickness (plate thickness) of the lamination layer part 120 of the air cleaner unit 40 is reduced in comparison with the case where the lamination layer part 120 is formed of the only carbon fiber layers 163, 163B. Due to the reduction in the thickness of the lamination layer part 120, the capacity of the air cleaner unit 40 can be ensured sufficiently.

Further, since the lamination layer part 120 is formed of the carbon fiber layers 163, 163B and the elastic material layers 164, 164B, the air intake noises and vibrations produced in the air cleaner unit 40 can be reduced or decreased.

Since the air intake noises and vibrations produced in the air cleaner unit 40 are able to be reduced or decreased due to the provision of the lamination layer part 120, the number of reinforcing portions (ribs) necessary for enhancing the rigidity of the air cleaner unit 40 can be reduced. Since the number of the reinforcing portions is reduced thereby making it possible to obtain the simpler structure, the air cleaner unit 40 capable of realizing the cost reduction can be provided.

Further, the carbon fiber layers 163, 163B and the elastic material layers 164, 164B are provided each in multiple layers in the lamination layer part 120. More precisely, the carbon fiber layers 163 of the first lamination layer part 161 are three layers, and the elastic material layers 164 thereof are two layers. In addition, the carbon fiber layers 163B of the second lamination layer part 162 are three layers, and the elastic material layers 164B thereof are two layers.

Since the lamination layer part 120 having the multiple elastic material layers 164, 164B is provided in the air cleaner unit 40, the air intake noises transmitted to the lamination layer part 120 can be more effectively reduced than the lamination layer part having a single layer of the elastic material layer.

Further, a swirl of an air stream due to the air intake is easily caused in and around the openings 135L, 135R of the air cleaner unit 40 into which the outside air are introduced. Moreover, the lower lateral wall sections 132L, 132R provided with the openings 135L, 135R have a larger area than other surfaces and are easily subject to the influence of the air intake noises and vibrations produced in the air cleaner unit 40. Furthermore, the main frames 22L, 22R only are disposed on the lateral sides of the lower lateral wall sections 132L, 132R. In particular, since the lightening holes are provided on the lateral sides of the openings 135L, 135R, the regions in and around the openings 135L, 135R are formed such that the intake air is hard to be converged in comparison with other regions, and are easily subject to the influence of the air intake noises and vibrations.

In the present invention, since the second lamination layer part 162 of which the elastic material layer is thicker than that of the first lamination layer part 161 is arranged around the openings 135L, 135R which is easily subject to the influence of the swirls of the air stream due to the air intake, it is possible to effectively reduce or decrease the air intake noises and vibrations caused in the air cleaner unit 40.

Referring to FIGS. 8 and 10 together, the cushioning material 171 is arranged between the recessed portion 170 in which the battery 152 is accommodated and the battery 152. With arrangement of the cushioning material 171, the recessed portion for accommodating the battery 152 is able to be formed in the first lamination layer part 161 of which the elastic material layer is thinner than that of the second lamination layer part 162 without being formed in the second lamination layer part 162 of which the elastic material layer is thicker than that of the first lamination layer part 161. As a result, due to the cushioning material 171 and the first lamination layer part 161, the air intake noises and vibrations caused in the air cleaner unit 40 can be reduced or decreased while reducing the cost for the air cleaner unit 40.

Referring again to FIG. 3, the electrical components such as the battery 512, the fuse box 155, the FI unit 151 and others are arranged on the upper surface of the casing body 52. Therefore, lengths of harnesses to be arranged can be shortened in comparison with the case where the electric components are not arranged on the upper surface of the casing body 52. As a result, it is possible to decrease the weight and to reduce the vehicle costs by shortening the harnesses.

Referring to FIGS. 2 and 7A, B together, the second lamination layer part 162 is arranged in at least a part of the upper surface of the casing body 52. In addition, in FIG. 1, the casing body 52 is arranged between the rider's seat 18 and the steering handle 27, and during travelling, rider's ears are located above the casing body 52. Moreover, the fuel tank 17 is configured to cover the upper surface of the casing body 52 thereby making it relatively difficult to converge the noise. Therefore, the rider may be easily subject to the influence of the noises and vibrations caused in the air cleaner unit 40. In the present invention, since the rider is located above the upper surface of the casing body 52, the air intake noises and vibrations transmitted from the casing body 52 toward the rider become hard to be transmitted to the rider. Therefore, it is possible to enhance silence of the air cleaner unit 40.

Further, since by utilizing an engine sound which is louder than the air intake noise, the air intake noises become less noticeable, the elastic material layers 164 located in a face to face relationship with the cylinder sections (the front cylinder 31 and the rear cylinder 32) can be reduced in thickness. Accordingly, it is possible to reduce the cost for the air cleaner unit 40.

Although the present invention is applied to the two-wheeled motorcycle in the preferred embodiment, it may be applied to a three-wheeled vehicle and may be properly applied to a general vehicle.

Further, although the lamination layer part is provided in the casing body, it may be provided in the air intake duct.

Furthermore, although a high elastic material such as nitrile rubber (NBR) is used as the elastic material in the embodiment, the high elastic material or elastic material which is commonly used may be used.

The present invention is suitably applied to the two-wheeled motorcycle provided with the air cleaner unit.

What is claimed is:

1. A motorcycle in which a carbon fiber is used for an air cleaner unit, and outside air is introduced through the air cleaner unit into an engine, comprising:
    a lamination layer part formed by laminating plural kinds of materials is arranged in a region of at least a portion of the air cleaner unit, and the lamination layer part is formed of a carbon fiber layer and an elastic material layer;
    an air intake duct for introducing the outside air; and
    a casing body provided with an opening to be connected to the air intake duct, wherein
    each of the carbon fiber layer and the elastic material layer is provided in multiple layers in the lamination layer part, and the lamination layer part comprises a first lamination layer part and a second lamination layer part of which the elastic material layer is thicker than that of the first lamination layer part,
    the second lamination layer part is arranged around the opening,
    the upper surface of the casing body is formed with a recess portion for accommodating a battery,
    the recess portion is formed in the first lamination layer part,
    a cushioning material is arranged between the first lamination layer part and the battery, and
    the battery is mounted on the upper surface of the casing body by fastening a battery cover for covering the battery.

2. The motorcycle according to claim 1, wherein the engine is formed in a V-type, and includes cylinder sections of the engine each of which is arranged in front of and at the rear of the casing body, and a pair of left and right vehicle body frames is located on left and right lateral sides of the casing body, and wherein the first lamination layer part is arranged on surfaces of the casing body facing the cylinder sections, and the second lamination layer part is arranged in at least a part of an upper surface of the casing body.

* * * * *